(12) United States Patent
Iwata

(10) Patent No.: US 12,459,429 B2
(45) Date of Patent: Nov. 4, 2025

(54) OCCUPANT STATE MONITORING APPARATUS

(71) Applicant: SUBARU CORPORATION, Tokyo (JP)

(72) Inventor: Satoru Iwata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 364 days.

(21) Appl. No.: 18/178,058

(22) Filed: Mar. 3, 2023

(65) Prior Publication Data

US 2023/0302992 A1 Sep. 28, 2023

(30) Foreign Application Priority Data

Mar. 22, 2022 (JP) .................. 2022-045712

(51) Int. Cl.
*G06T 7/70* (2017.01)
*B60Q 9/00* (2006.01)
*G06V 20/59* (2022.01)

(52) U.S. Cl.
CPC ............ *B60Q 9/00* (2013.01); *G06T 7/70* (2017.01); *G06V 20/597* (2022.01); *G06T 2207/30201* (2013.01); *G06T 2207/30268* (2013.01)

(58) Field of Classification Search
CPC ... B60Q 9/00; G06T 7/70; G06T 2207/30201; G06T 2207/30268; G06V 20/597
See application file for complete search history.

(56) References Cited

U.S. PATENT DOCUMENTS

| | | | | |
|---|---|---|---|---|
| 6,200,139 | B1* | 3/2001 | Clapper ................. | G09B 9/042 600/587 |
| 2014/0070934 | A1* | 3/2014 | Chau ..................... | B60K 35/20 340/438 |
| 2021/0012128 | A1 | 1/2021 | Wang et al. | |
| 2022/0144284 | A1* | 5/2022 | Conners ................ | B60W 50/16 |
| 2022/0203996 | A1* | 6/2022 | Katz .................... | B60W 50/14 |
| 2022/0204035 | A1* | 6/2022 | MacKenzie ........... | B60W 50/14 |
| 2022/0363283 | A1* | 11/2022 | Prill ...................... | B60W 40/08 |

FOREIGN PATENT DOCUMENTS

| | | |
|---|---|---|
| JP | 2009-023565 A | 2/2009 |
| JP | 2021-518010 A | 7/2021 |

* cited by examiner

*Primary Examiner* — Syed Haider

(74) *Attorney, Agent, or Firm* — Rimon P.C.

(57) ABSTRACT

An occupant state monitoring apparatus includes an imager, a storage, and a calculation controller. The imager is configured to capture an image of an occupant who is in a vehicle. The storage is configured to store vehicle member coordinates that are position information of a vehicle member of the vehicle. The calculation controller is configured to calculate, based on the image, gaze coordinates representing a position at which the occupant gazes, and determine a state of the occupant based on the gaze coordinates and the vehicle member coordinates.

18 Claims, 7 Drawing Sheets

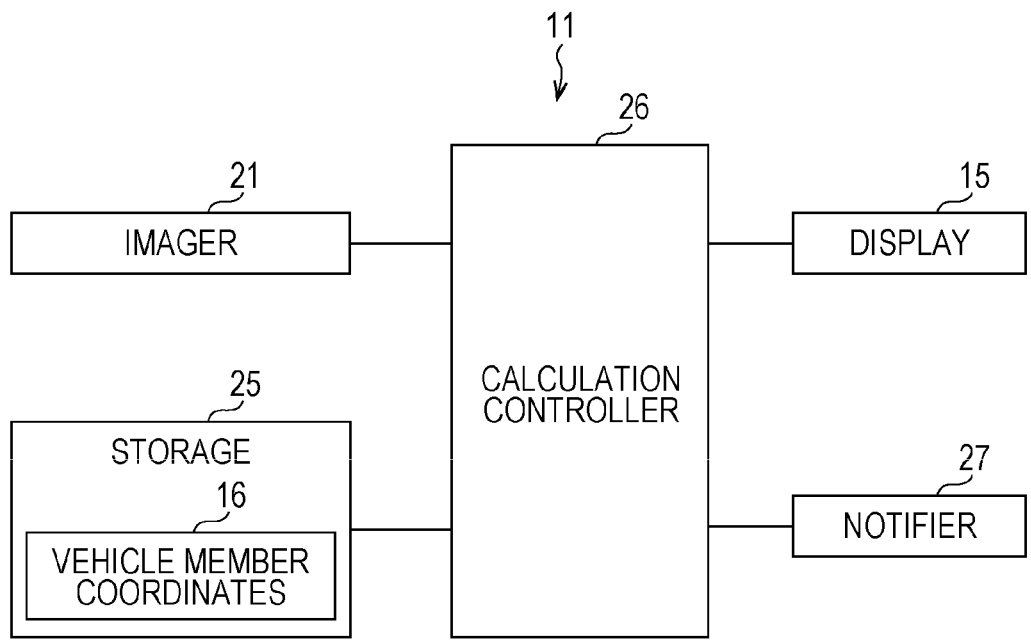
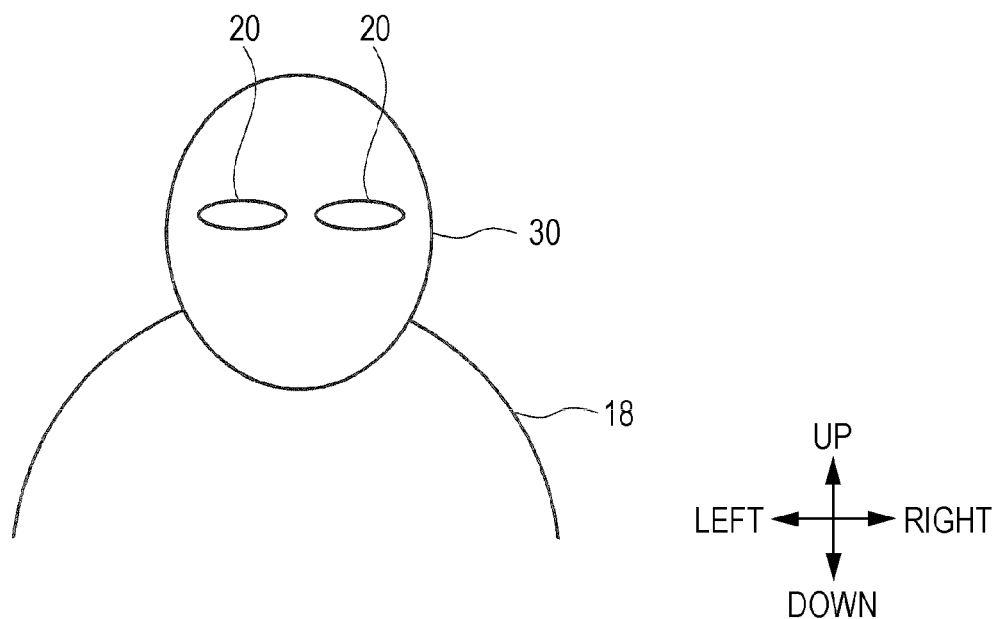

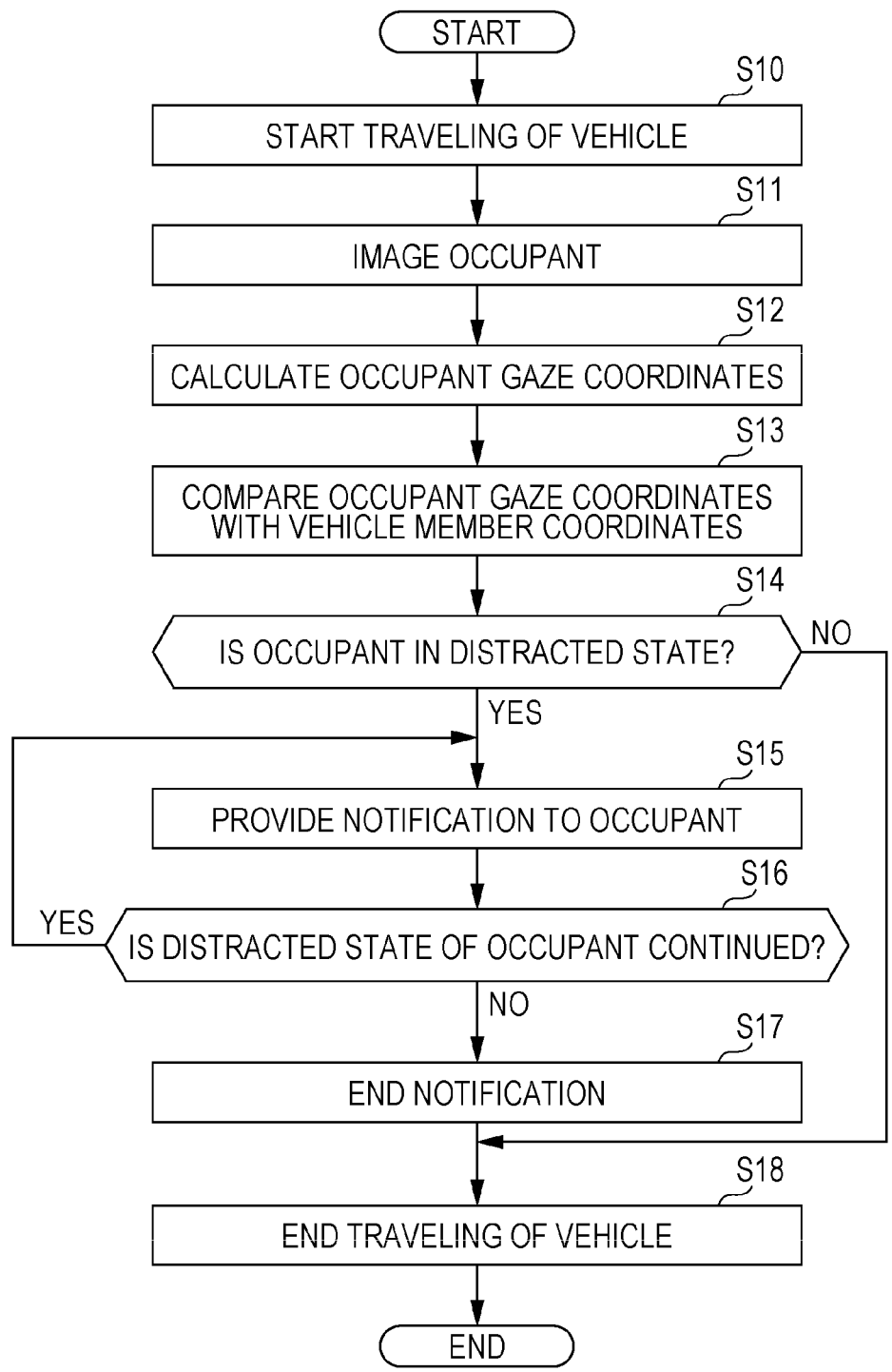

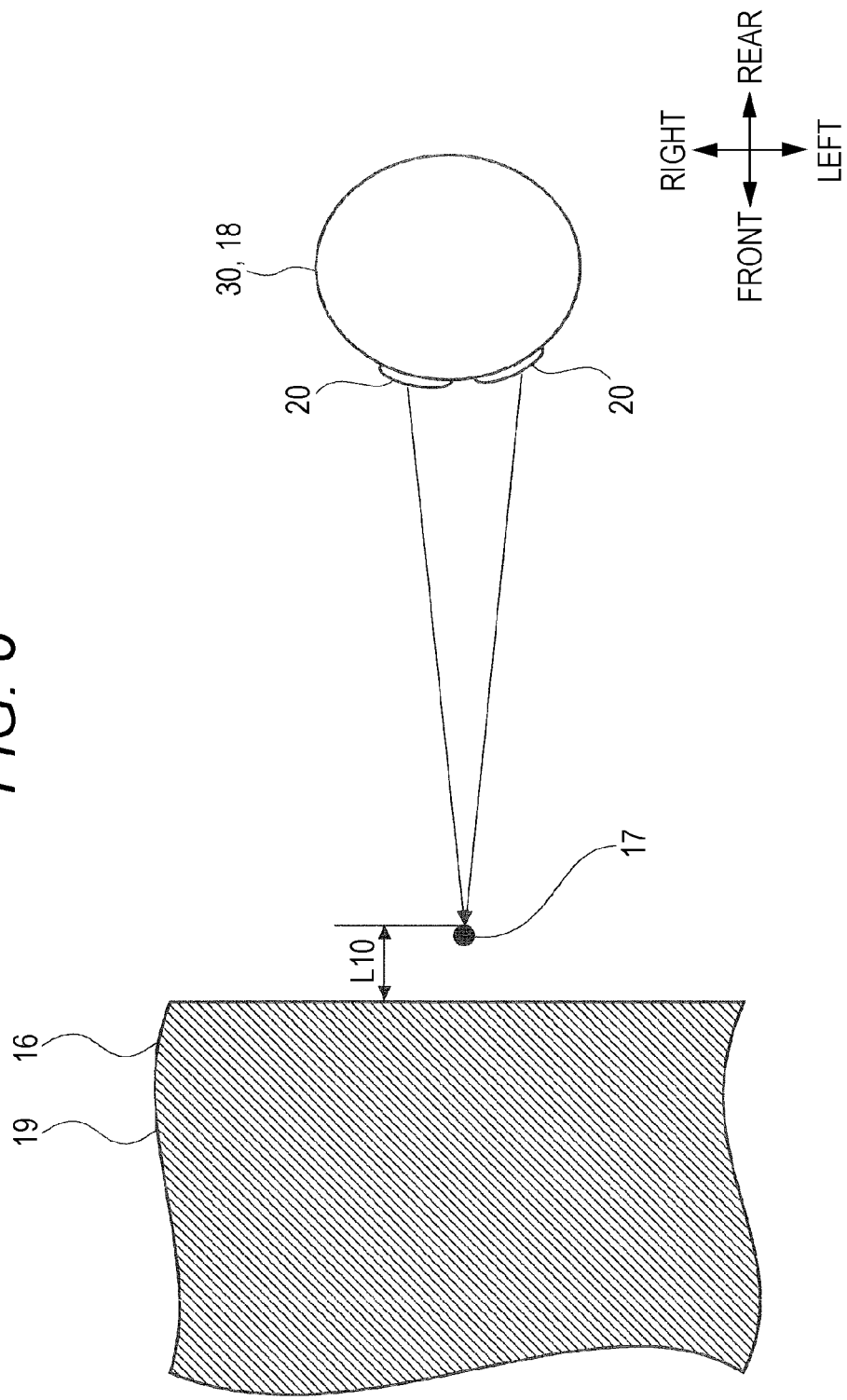

FIG. 7

| LINE OF SIGHT ANGLE | FOCAL POINT | 3D SURFACE DATA | PREDICTION ABOUT GAZE TARGET | ALARM DURING TRAVELING |
|---|---|---|---|---|
| DRIVING VISION (WINDSHIELD OR MIRROR) | VEHICLE EXTERIOR | — | DRIVING VIEW FIELD | UNNECESSARY |
| | VEHICLE INTERIOR | SURFACE | FOGGING OF WINDSHIELD OR DIRT ON WINDSHIELD SURFACE | UNNECESSARY |
| | | NEAR SIDE | DISTRACTED STATE OF GAZING AT CELLULAR PHONE, ITEM, OR THE LIKE | NECESSARY |
| INTERIOR SURFACE | VEHICLE INTERIOR | SURFACE | INFOTAINMENT OR STAIN OF INTERIOR | UNNECESSARY |
| | | NEAR SIDE | DISTRACTED STATE OF GAZING AT CELLULAR PHONE, ITEM, OR THE LIKE | NECESSARY |
| | | FAR SIDE | DETACHED PART, DAMAGE, OR THE LIKE | UNNECESSARY |

OCCUPANT STATE MONITORING APPARATUS

CROSS-REFERENCE TO RELATED APPLICATIONS

The present application claims priority from Japanese Patent Application No. 2022-045712 filed on Mar. 22, 2022, the entire contents of which are hereby incorporated by reference.

BACKGROUND

The disclosure relates to an occupant state monitoring apparatus.

For example, as a conventional apparatus for monitoring a state of an occupant in a vehicle, there are known structures disclosed in Japanese Unexamined Patent Application Publication (JP-A) No. 2009-023565 and Japanese Unexamined Patent Application Publication (Translation of PCT Application) (JP-T) No. 2021-518010.

JP-A No. 2009-023565 discloses a driving assistance apparatus in which a display target to be displayed on a monitor is determined based on an occupant's line of sight detected by a line-of-sight detector. In addition, the monitor displays a video of the display target captured by an outside vehicle camera.

JP-T No. 2021-518010 discloses that an attention monitoring result of a driver is determined according to a type distribution of gazing areas of frames of face images included within at least one sliding time window in a video.

SUMMARY

An aspect of the disclosure provide an occupant state monitoring apparatus. The occupant state monitoring apparatus includes an imager, a storage, and a calculation controller. The imager is configured to capture an image of an occupant who is in a vehicle. The storage stores vehicle member coordinates that are position information of a vehicle member of the vehicle. The calculation controller is configured to calculate, based on the image, gaze coordinates representing a position at which the occupant gazes, and determine a state of the occupant based on the gaze coordinates and the vehicle member coordinates.

An aspect of the disclosure provide an occupant state monitoring apparatus. The occupant state monitoring apparatus includes a camera, a storage, and circuitry. The camera is configured to capture an image of an occupant who is in a vehicle. The storage stores vehicle member coordinates that are position information of a vehicle member of the vehicle. The circuitry is configured to calculate, based on the image, gaze coordinates representing a position at which the occupant gazes, and determine a state of the occupant based on the gaze coordinates and the vehicle member coordinates.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 2 is a block diagram illustrating a connection configuration of the occupant state monitoring apparatus according to the embodiment of the disclosure;

FIG. 3 is a schematic diagram illustrating a state of an occupant in the occupant state monitoring apparatus according to the embodiment of the disclosure;

FIG. 4 is a flowchart illustrating a method of monitoring the state of the occupant according to the embodiment of the disclosure;

FIG. 6 is a detailed schematic diagram illustrating a relationship between the gaze coordinates and the vehicle member coordinates in the occupant state monitoring apparatus according to the embodiment of the disclosure;

FIG. 7 is a table illustrating a relationship between a line of sight and presence or absence of notification in the occupant state monitoring apparatus according to the embodiment of the disclosure.

DETAILED DESCRIPTION

The techniques disclosed in JP-A No. 2009-023565 and JP-T No. 2021-518010 described above have room for improvement from the viewpoint of more accurately monitoring the state of the occupant.

For example, in the techniques disclosed in JP-A No. 2009-023565 and JP-T No. 2021-518010, the state of the occupant is estimated using an imager such as a video and a camera, but information regarding a gaze point of the occupant in three dimensions is not accurately grasped. Thus, monitoring a distracted state of the occupant using these techniques involves difficulty in accurately monitoring the distracted state.

It is desirable to provide an occupant state monitoring apparatus that can accurately monitor a state of an occupant who is in a vehicle.

Hereinafter, an occupant state monitoring apparatus 11 according to an embodiment of the disclosure will be described in detail with reference to the drawings.

Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1A:
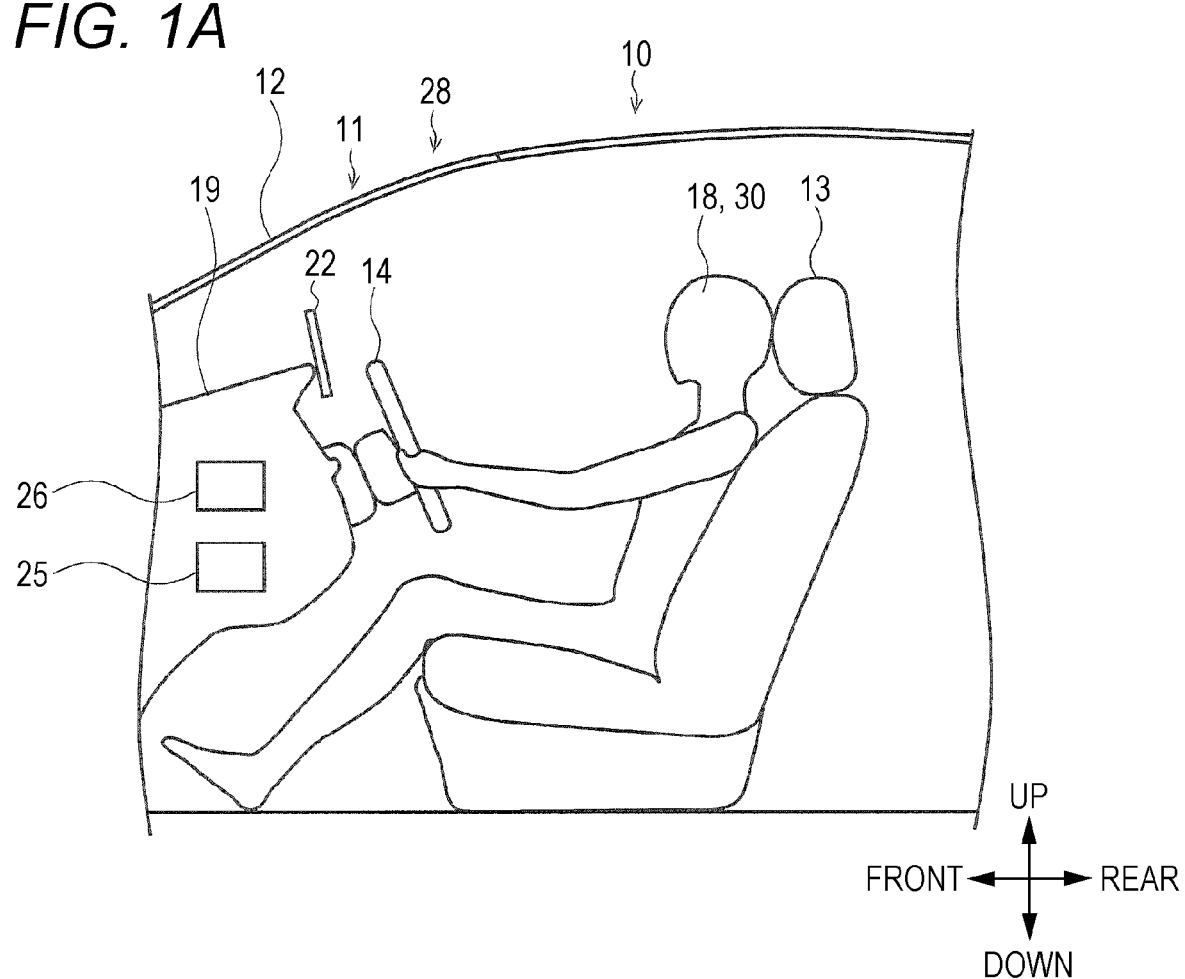
FIG. 1A is a side view illustrating a vehicle including an occupant state monitoring apparatus according to an embodiment of the disclosure.
Figure 1B:
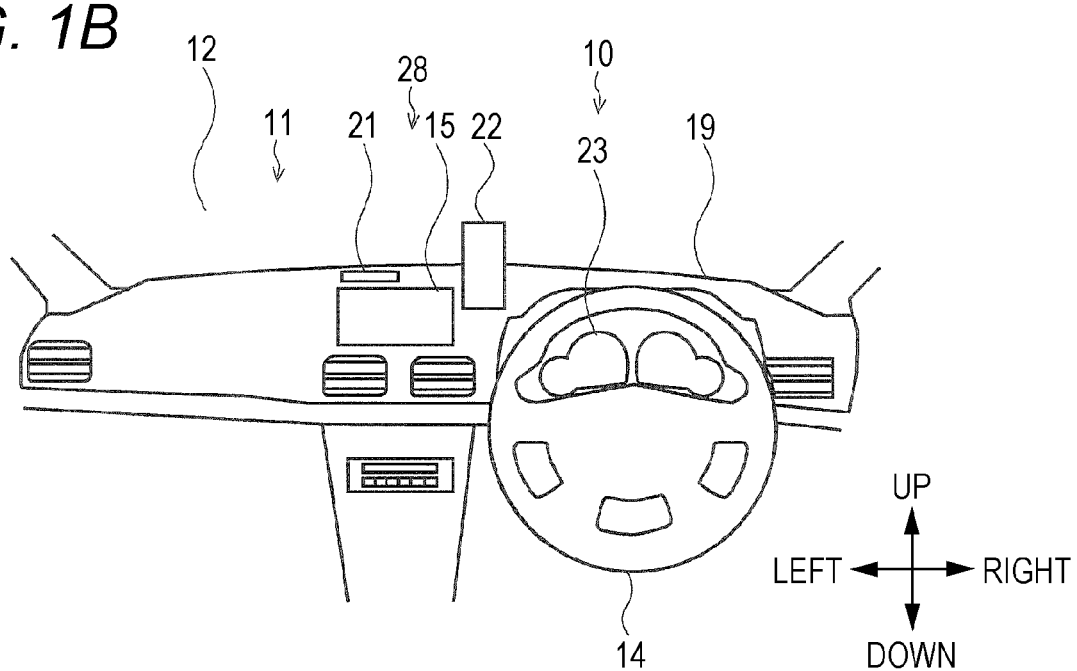
FIG. 1B is a view illustrating a front part of a vehicle interior of the vehicle including the occupant state monitoring apparatus according to the embodiment of the disclosure.

FIG. 1A is a side view illustrating a vehicle 10 including the occupant state monitoring apparatus 11. FIG. 1B is a view illustrating a front part of a vehicle interior of the vehicle 10 including the occupant state monitoring apparatus 11.

The occupant state monitoring apparatus 11 monitors a state of an occupant 18 who is in the vehicle 10. The occupant state monitoring apparatus 11 mainly includes an imager 21, a storage 25, and a calculation controller 26. A detailed function and configuration of the occupant state monitoring apparatus 11 will be described later with reference to FIG. 2 and subsequent drawings.

The vehicle 10 is, for example, an automobile, a train, or the like. The vehicle 10 is, for example, an engine mounted vehicle, an electrical vehicle (EV), a hybrid electrical vehicle (HEV), or a plug-in hybrid electrical vehicle (PHEV).

The occupant 18 who drives the vehicle 10 sits in a seat 13 which is a driver's seat. The occupant 18 drives the vehicle 10 by operating a brake pedal, an accelerator pedal, and the like, which are not illustrated and a steering wheel 14.

A windshield 12 is disposed on a front side of a vehicle body 28.

As illustrated in FIG. 1B, a display 15 is disposed near a left-right center of a dashboard 19. The display 15 is a multi-function display that collectively displays various kinds of information related to the vehicle 10. For example, the various kinds of information include an outside air temperature, an operation status of an air conditioner, and the like. In one embodiment, the display 15 may also serve as a "notifier" that displays an alarm to be described later. Here, the notifier may be a speaker that emits a warning sound.

The imager 21 is disposed above the display 15 in the dashboard 19. The imager 21 is configured to capture an image of, for example, a head 30 of the occupant 18 who drives the vehicle 10. The imager 21 is referred to as a driver monitor system (DMS). The imager 21 is, for example, an infrared camera or the like.

An instrument cluster 23 is disposed behind an upper part of the steering wheel 14. The instrument cluster 23 displays a vehicle speed, an engine rotational speed, and the like.

The occupant state monitoring apparatus 11 monitors, with the imager 21, a state of the occupant 18 who drives the vehicle 10, and when performing a determination that the occupant 18 is in a distracted state and the like, notifies the occupant 18 of a result of the determination. Consequently, the occupant 18 can recognize his or her own state by the notification from the display 15 or the like, and can return to a normal state of concentrating on a driving operation from the distracted state. Such an operation will be described later with reference to a flowchart.

FIG. 2 is a block diagram illustrating a connection configuration of the occupant state monitoring apparatus 11.

The occupant state monitoring apparatus 11 mainly includes the calculation controller 26, the imager 21, the storage 25, the display 15, and a notifier 27.

The calculation controller 26 includes a central processing unit (CPU), a random-access memory (RAM), a read-only memory (ROM), and the like. The calculation controller 26 has input-side terminals coupled to the imager 21 and the storage 25. The calculation controller 26 has output-side terminals coupled to the display 15 and the notifier 27. As will be described later, the calculation controller 26 calculates, based on an image obtained by imaging the occupant 18, gaze coordinates 17 representing a position at which the occupant 18 gazes, and determines the state of the occupant 18 based on the gaze coordinates 17 and vehicle member coordinates 16.

The imager 21 images the occupant 18 who is in the vehicle 10. The imager 21 is, for example, an infrared camera, and can image the head 30 of the occupant 18 during the day and at night.

The storage 25 stores the vehicle member coordinates 16 being position information of a vehicle member. The position information of the vehicle member indicates three-dimensional positions on a surface of the dashboard 19 illustrated in FIG. 1A and a surface of each member provided in the dashboard 19.

As described above, the display 15 displays various kinds of information related to the vehicle 10.

The notifier 27 is, for example, a speaker disposed in the vehicle body 28. When a determination is performed that the occupant 18 is in the distracted state, the notifier 27 notifies, by sound, the occupant 18 of a result of the determination.

FIG. 3 is a schematic diagram illustrating the state of the occupant 18 imaged by the imager 21. The imager 21 images eyeballs 20 of the head 30 of the occupant 18. Furthermore, the calculation controller 26 calculates, from a video obtained by imaging the head 30 or the eyeballs 20, the gaze coordinates 17 representing a three-dimensional position at which the occupant 18 gazes. For example, the calculation controller 26 calculates the gaze coordinates 17 from positions of pupils and/or irises of the eyeballs 20.

FIG. 4 is a flowchart illustrating a method of monitoring the state of the occupant 18. Referring to FIG. 4, a method for monitoring the distracted state as the state of the occupant 18 by the occupant state monitoring apparatus 11 will be described.

In step S10, the vehicle 10 starts traveling based on an instruction from the occupant 18.

In step S11, the calculation controller 26 causes the imager 21 to image the head 30 and the eyeballs 20 of occupant 18. The calculation controller 26 continues the imaging with the imager 21 until the traveling of vehicle 10 is ended.

Figure 5A:
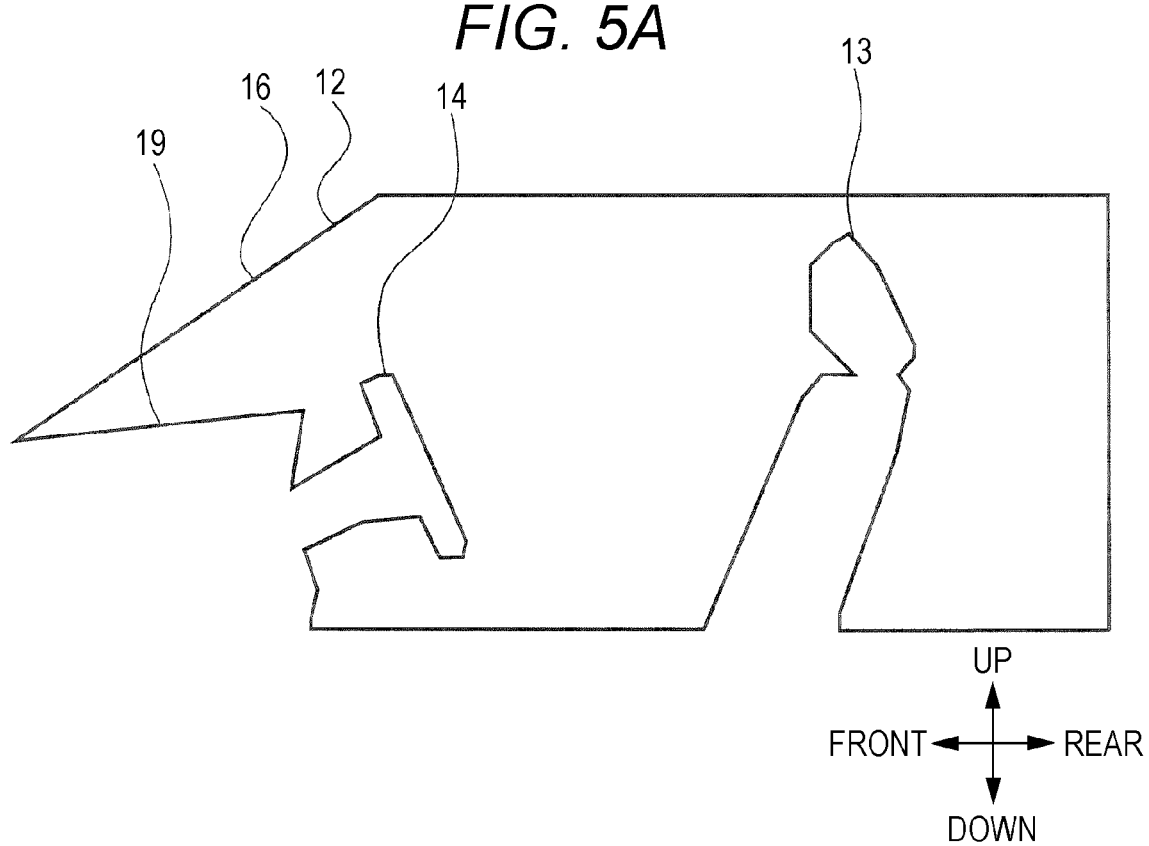
FIG. 5A is a schematic diagram illustrating vehicle member coordinates in the occupant state monitoring apparatus according to the embodiment of the disclosure.
Figure 5B:
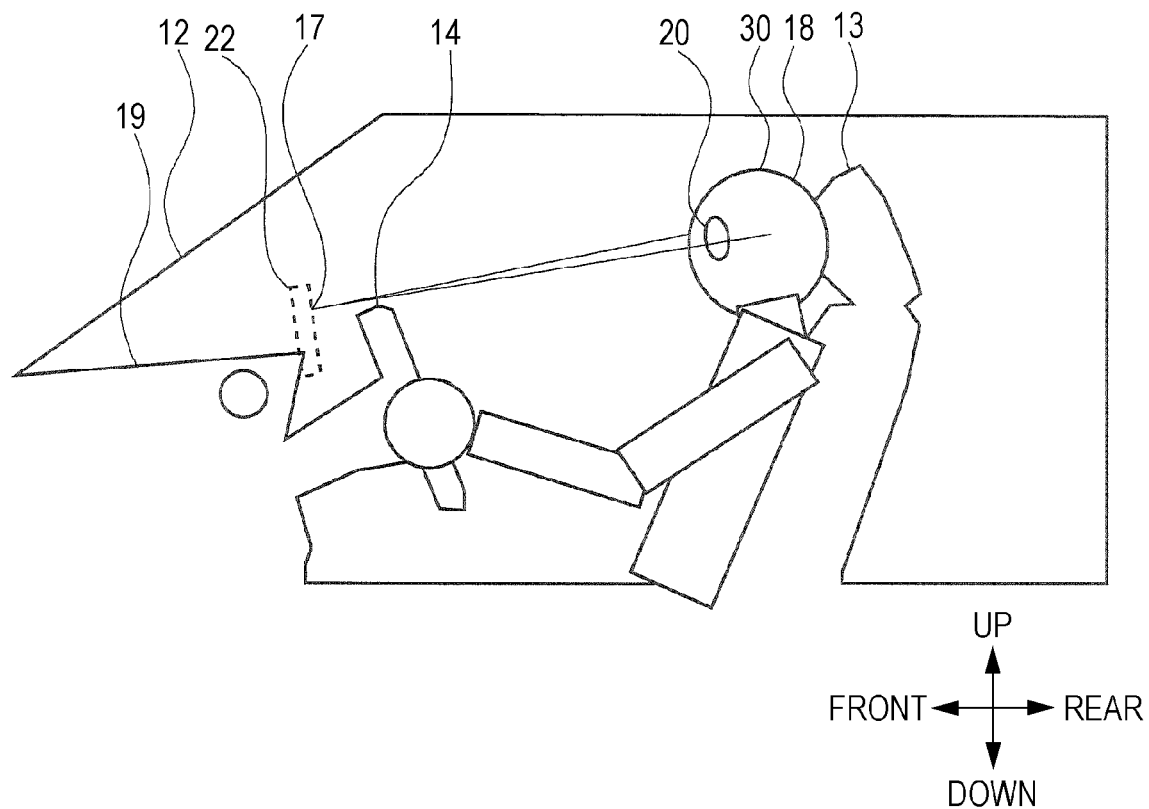
FIG. 5B is a schematic diagram illustrating gaze coordinates in the occupant state monitoring apparatus according to the embodiment of the disclosure.

In step S12, the calculation controller 26 calculates three-dimensional coordinates of the gaze coordinates 17 from the image captured by the imager 21. In one example, as illustrated in FIG. 5B, the calculation controller 26 performs calculation for identifying the gaze coordinates 17 from the image obtained by imaging the occupant 18. In more detail, as illustrated in FIG. 6, the calculation controller 26 calculates a line-of-sight angle and a focal length from lines of sight of the right and left eyeballs 20, calculates line-of-sight coordinate angles from the positions of the eyeballs 20, calculates a gaze point coordinate absolute value (relative vehicle body coordinates) from the position and inclination of the head 30, and calculates a gaze point coordinate absolute value (relative vehicle body coordinates) from a posture of the occupant 18. In the present embodiment, the three-dimensional position of the gaze coordinates 17 can be accurately obtained by calculating the gaze coordinates 17 based on the information regarding, for example, the eyeballs 20 of the occupant 18.

In step S13, the calculation controller 26 compares the gaze coordinates 17 with the vehicle member coordinates 16. Referring to FIG. 5A, the vehicle member coordinates 16 are three-dimensional coordinates representing the surface of the vehicle member constituting the interior of the vehicle 10. For example, the vehicle member coordinates 16 are three-dimensional coordinates representing an inner surface of the windshield 12, an inner surface of the dashboard 19, and the like. For example, the calculation controller 26 superimposes the gaze coordinates 17 and the vehicle member coordinates 16 to compare the gaze coordinates 17 with the vehicle member coordinates 16.

In step S14, the calculation controller 26 monitors the state of the occupant 18 and determines, for example, whether the occupant 18 is in the distracted state.

In one calculation example, the gaze coordinates 17 can be compared with the vehicle member coordinates 16. For example, referring to FIG. 6, the calculation controller 26 can determine that the occupant 18 is in the distracted state when the gaze coordinates 17 are closer to the occupant 18 than the surface of the vehicle member is.

In more detail, when a distance L10 between the gaze coordinates 17 and the vehicle member coordinates 16 representing a rear surface of the dashboard 19 is equal to or greater than a predetermined threshold, the calculation controller 26 can determine that the occupant 18 is in the distracted state. In this case, the occupant 18 is determined as not gazing the front of the vehicle 10 through the windshield 12, and for example, to be distracted by a portable device 22 such as a smartphone disposed on a rear side of the dashboard 19. In this case, as will be described later, it is possible to provide notification for the occupant 18 to discontinue distracted driving.

Referring to a table of FIG. 7, in step S14, it is possible to determine, based on a type of a gaze target object toward which the line of sight of the occupant 18 is directed, whether the occupant 18 is in the distracted state or whether the notification is necessary.

In one example, when the line-of-sight angle of the occupant 18 is directed to the windshield 12 or a mirror (a side mirror or a rearview mirror) and a gaze point is in a vehicle exterior, the calculation controller 26 determines that the occupant 18 is not in the distracted state and that notification is unnecessary.

When the line-of-sight angle of the occupant 18 is directed to the windshield 12 or the mirror (the side mirror or the rearview mirror) and the gaze point is in the vehicle interior, the calculation controller 26 considers a relationship between the vehicle member coordinates 16 and the gaze coordinates 17. That is, when the gaze coordinates 17 are in the surface or in the vicinity of the vehicle member coordinates 16, the calculation controller 26 determines that the occupant 18 momentarily glances at the fogging of the windshield or the dirt on the windshield, that the occupant 18 is not in the distracted state, and that notification is unnecessary. When the gaze coordinates 17 are on a near side with respect to the vehicle member coordinates 16, that is, closer to the occupant 18, the calculation controller 26 determines that the occupant 18 is in the distracted state of gazing at the portable device 22 such as the smartphone, and that the notification is necessary.

Furthermore, when the line-of-sight angle of the occupant 18 is directed to an interior surface such as the dashboard 19 and the focal point is in the vehicle interior, the calculation controller 26 considers the relationship between the vehicle member coordinates 16 and the gaze coordinates 17. That is, when the gaze coordinates 17 are in the surface or in the vicinity of the vehicle member coordinates 16, the calculation controller 26 determines that the occupant 18 momentarily glances at infotainment or a stain of the interior, that the occupant 18 is not in the distracted state, and that notification is unnecessary. When the gaze coordinates 17 are on the near side with respect to the vehicle member coordinates 16, that is, closer to the occupant 18, the calculation controller 26 determines that the occupant 18 is in the distracted state of gazing at the portable device 22 such as the smartphone, and that the notification is necessary. When the gaze coordinates 17 are on a far side with respect to the vehicle member coordinates 16, that is, on a side away from the occupant 18, the calculation controller 26 determines that the occupant 18 momentarily glances a detached part or damage, that the occupant 18 is not in the distracted state, and that notification is unnecessary.

By determining the distracted state of the occupant 18 as described above, the distracted state can be accurately detected and notified in accordance with an internal situation of the vehicle 10 and a driving situation of the occupant 18.

Figure 8:
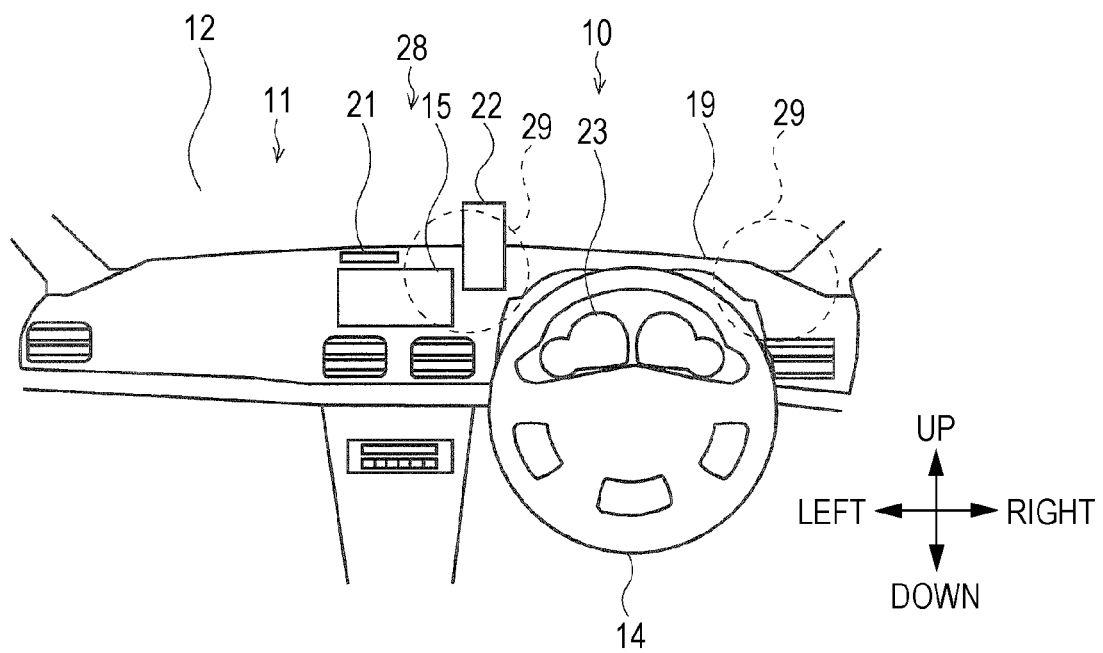
FIG. 8 is a diagram illustrating weighting for an area in the occupant state monitoring apparatus according to the embodiment of the disclosure.

Referring to FIG. 8, in step S14, a weighting process can be performed in which a degree of being determined to be in the distracted state is increased in an area where the portable device 22 or the like is disposed. In one example, in the dashboard 19, an area where the portable device 22, such as a smartphone, is disposed is limited. Normally, the portable device 22 is disposed near the left side or the right side of the steering wheel 14 in consideration of convenience and visibility of the occupant 18. In FIG. 8, the portable device 22 is frequently disposed in one of areas 29 surrounded by dotted lines.

Referring to FIG. 6, in an example of the weighting process, it is conceivable to set the threshold to be compared with L10 to be smaller within the areas 29 than other areas. This setting facilitates more reliable detection of the distracted state within the areas 29.

Consequently, the calculation controller 26 can perform the weighting process in which the degree of being determined to be in the distracted state is increased in the areas 29. That is, when the line of sight of the occupant 18 is directed to the area 29, the calculation controller 26 determines that the possibility that the occupant 18 is in the distracted state is high. On the other hand, when the line of sight of the occupant 18 is directed in a direction different from the area 29, the calculation controller 26 determines that the possibility that the occupant 18 is in the distracted state is low. In this case, it is possible to more accurately detect the distracted state where the occupant 18 gazes at the portable device 22.

If an affirmative decision "YES" is obtained in step S14, that is, if the occupant 18 is in the distracted state, the process proceeds to step S15.

If a negative decision "NO" is obtained in step S14, that is, if the occupant 18 is not in the distracted state, the process proceeds to step S18 and the notification is not performed.

In step S15, the calculation controller 26 provides the notification to the occupant 18. In one example, the calculation controller 26 causes a speaker or the like which is the notifier 27 to emit a voice or a warning sound in order to return the state of the occupant 18 from the distracted state to the normal state of concentrating on a driving operation. The notifier 27 may be the display 15. In this case, the display 15 displays an image for returning the state of the occupant 18 from the distracted state to the normal state. Providing the notification to the occupant 18 through the notifier 27 allows the occupant 18 to return to the normal state from the distracted state.

In step S16, the calculation controller 26 determines whether the distracted state of the occupant 18 is continued. The process in step S16 is similar to those in steps S13 and S14 described above.

If an affirmative decision "YES" is obtained in step S16, that is, if the distracted state of the occupant 18 is continued, the calculation controller 26 returns to step S15 and continues the notification.

If a negative decision "NO" is obtained in step S16, that is, if the distracted state of the occupant 18 is discontinued, the calculation controller 26 proceeds to step S17.

In step S17, the calculation controller 26 ends the notification with the notifier 27.

In step S18, the occupant 18 ends traveling of the vehicle 10. That is, the occupant 18 stops the vehicle 10.

Although the embodiment of the disclosure has been described above, the disclosure is not limited thereto, and modifications can be made without departing from the gist of the disclosure. In addition, the above-described modes can be combined with each other.

For example, in the above-described embodiment, although the monitoring target state of the calculation controller 26 is the distracted state, the monitoring target state may be any state other than the distracted state. For example, the monitoring target state of the calculation controller 26 may be a state where the posture of the occupant 18 becomes considerably unbalanced.

According to the occupant state monitoring apparatus of the disclosure, the state of the occupant can be determined by three-dimensionally calculating the gaze coordinates from the image captured by the imager and comparing the gaze coordinates with the vehicle member coordinates. This facilitates the detection of, for example, the distracted state of the occupant. That is, even if the line of sight of the occupant is directed forward, when the occupant gazes at the portable device or the like disposed in the vehicle interior, the distracted state of the occupant can be detected and notified, and the safety at the time of driving the vehicle can be improved.

The invention claimed is:

1. An occupant state monitoring apparatus comprising:
a camera configured to capture an image of an occupant who is in a vehicle;
a storage configured to store vehicle member coordinates, the vehicle member coordinates being position information of a vehicle member of the vehicle, the vehicle member coordinates indicating a position of a surface of the vehicle member in three-dimensional coordinates; and
a calculation controller configured to:
calculate, based on the image, gaze coordinates representing a position of a point at which the occupant gazes in the three-dimensional coordinates; and
determine that the occupant is in a distracted state, upon determining that the point at which the occupant gazes is located between the surface of the vehicle member and the occupant,
wherein the calculation controller is further configured to:
determine whether a distance between the point at which the occupant gazes and the surface of the vehicle member is equal to or greater than a predetermined threshold;
in response to determining that the point at which the occupant gazes is located between the surface of the vehicle member and the occupant, but the distance is not equal to or greater than the predetermined threshold, determine that the occupant is not in the distracted state; and
in response to determining that the point at which the occupant gazes is located between the surface of the vehicle member and the occupant, and the distance is equal to or greater than the predetermined threshold, determine that the occupant is in the distracted state.

2. The occupant state monitoring apparatus according to claim 1, wherein the calculation controller is configured to calculate the gaze coordinates from information regarding eyeballs of the occupant included in the image.

3. The occupant state monitoring apparatus according to claim 1, further comprising a notifier,
wherein the calculation controller is configured to, upon determining that the occupant is in the distracted state, cause the notifier to provide notification to the occupant.

4. The occupant state monitoring apparatus according to claim 2, further comprising a notifier,
wherein the calculation controller is configured to, upon determining that the occupant is in the distracted state, cause the notifier to provide notification to the occupant.

5. The occupant state monitoring apparatus according to claim 1, wherein the calculation controller is configured to perform a weighting process in which a degree at which the occupant is determined to be in a distracted state is increased when the gaze coordinates fall within an area where a portable device is disposed.

6. The occupant state monitoring apparatus according to claim 2, wherein the calculation controller is configured to perform a weighting process in which a degree at which the occupant is determined to be in a distracted state is increased when the gaze coordinates fall within an area where a portable device is disposed.

7. The occupant state monitoring apparatus according to claim 3, wherein the calculation controller is configured to perform a weighting process in which a degree at which the occupant is determined to be in a distracted state is increased when the gaze coordinates fall within an area where a portable device is disposed.

8. The occupant state monitoring apparatus according to claim 4, wherein the calculation controller is configured to perform a weighting process in which a degree at which the occupant is determined to be in a distracted state is increased when the gaze coordinates fall within an area where a portable device is disposed.

9. An occupant state monitoring apparatus comprising:
a camera configured to capture an image of an occupant who is in a vehicle;
a storage configured to store vehicle member coordinates, the vehicle member coordinates being position information of a vehicle member of the vehicle, the vehicle member coordinates indicating a position of a surface of the vehicle member in three-dimensional coordinates; and
circuitry configured to:
calculate, based on the image, gaze coordinates representing a position of a point at which the occupant gazes in the three-dimensional coordinates; and
determine that the occupant is in a distracted state, upon determining that the point at which the occupant gazes is located between the surface of the vehicle member and the occupant,
wherein the circuitry is further configured to:
determine whether a distance between the point at which the occupant gazes and the surface of the vehicle member is equal to or greater than a predetermined threshold;
in response to determining that the point at which the occupant gazes is located between the surface of the vehicle member and the occupant, but the distance is not equal to or greater than the predetermined threshold, determine that the occupant is not in the distracted state; and in response to determining that the point at which the occupant gazes is located between the surface of the vehicle member and the occupant, and the distance is equal to or greater than the predetermined threshold, determine that the occupant is in the distracted state.

10. The occupant state monitoring apparatus according to claim 1, wherein the vehicle member includes a dashboard of the vehicle, and
wherein the surface of the vehicle member includes a surface of the dashboard exposed inside a vehicle compartment of the vehicle.

11. The occupant state monitoring apparatus according to claim 9, wherein the vehicle member includes a dashboard of the vehicle, and
wherein the surface of the vehicle member includes a surface of the dashboard exposed inside a vehicle compartment of the vehicle.

12. The occupant state monitoring apparatus according to claim 1, wherein the vehicle member includes a windshield of the vehicle, and
wherein the surface of the vehicle member includes a surface of the windshield exposed inside a vehicle compartment of the vehicle.

13. The occupant state monitoring apparatus according to claim 9, wherein the vehicle member includes a windshield of the vehicle, and
wherein the surface of the vehicle member includes a surface of the windshield exposed inside a vehicle compartment of the vehicle.

14. The occupant state monitoring apparatus according to claim 1, wherein
the vehicle member includes a mirror of the vehicle, and
wherein the surface of the vehicle member includes a surface of the mirror facing rearward of the vehicle.

15. The occupant state monitoring apparatus according to claim 9,
wherein the vehicle member includes a mirror of the vehicle, and
wherein the surface of the vehicle member includes a surface of the mirror facing rearward of the vehicle.

16. The occupant state monitoring apparatus according to claim 9, wherein the circuitry is further configured to calculate the gaze coordinates from information regarding eyeballs of the occupant included in the image.

17. The occupant state monitoring apparatus according to claim 9, further comprising a notifier,
wherein the circuitry is further configured to, upon determining that the occupant is in the distracted state, cause the notifier to provide notification to the occupant.

18. The occupant state monitoring apparatus according to claim 9, wherein the circuitry is further configured to perform a weighting process in which a degree at which the occupant is determined to be in the distracted state is increased when the gaze coordinates fall within an area where a portable device is disposed.

* * * * *